United States Patent [19]

Luenser

[11] 3,931,727
[45] Jan. 13, 1976

[54] METHOD AND SYSTEM FOR DETECTING BRAKE WEAR IN A METAL FORMING MACHINE

[75] Inventor: Kurt K. Luenser, De Soto, Tex.
[73] Assignee: Verson Allsteel Press Company, Dallas, Tex.
[22] Filed: Sept. 9, 1974
[21] Appl. No.: 504,363

[52] U.S. Cl. ............................ 72/444; 72/19; 72/26; 100/53; 188/1 A; 192/30 W
[51] Int. Cl.² .......................................... B21J 7/46
[58] Field of Search ............ 72/6, 21, 19, 444, 441, 72/429, 26; 192/30 W, 129 A, 140, 142 R, 144; 188/1 A; 340/52 A, 147 MT; 100/53; 307/112, 92; 116/115, 115.5

[56] References Cited
UNITED STATES PATENTS

| 2,828,846 | 4/1958 | Viguers et al. | 192/129 |
| 3,056,481 | 10/1962 | Luenser | 100/53 |
| 3,268,047 | 8/1966 | Grygera et al. | 192/144 |
| 3,463,286 | 8/1969 | Jeavons | 192/144 |
| 3,572,484 | 3/1971 | Richins | 192/142 R |
| 3,589,482 | 6/1971 | Weston | 192/142 R |
| 3,628,357 | 12/1971 | Luenser | 100/53 |
| 3,666,965 | 5/1972 | Luenser | 340/147 MT |
| 3,693,770 | 9/1972 | Charchian et al. | 192/30 W |

Primary Examiner—C. W. Lanham
Assistant Examiner—James R. Duzan
Attorney, Agent, or Firm—Richards, Harris and Medlock

[57] ABSTRACT

The specification discloses a method and system for detecting brake wear in a metal forming machine having a ram operable by a rotative drive and further having a brake for stopping the ram. The amount of rotation of the drive for the machine is determined from the time of energization of the brake to the time of stopping of the ram by the brake. This determined amount of rotation is compared with a predetermined magnitude. An alarm is generated as the determined amount of rotation of the drive exceeds the predetermined magnitude, thereby indicating excessive brake wear. Further operation of the ram is then prevented upon the generation of an alarm. The specification further discloses a check system for checking the operation of various components of the detection system prior to detecting of the brake wear.

20 Claims, 3 Drawing Figures

METHOD AND SYSTEM FOR DETECTING BRAKE WEAR IN A METAL FORMING MACHINE

FIELD OF THE INVENTION

This invention relates to work safety systems and methods for use with machines having braked work producing members, and more particularly relates to a safety method and system for detecting brake wear in a machine having a work producing member which is movable by a drive and which is stopped by a brake.

THE PRIOR ART

Problems due to brake wear and failure have heretofore occurred in machines having a work producing member which is movable by a drive system and which is stopped by a brake. In particular, in metal forming machines such as press brakes and the like, rams are conventionally reciprocated by a rotating drive mechanism and are stopped by the application of a brake near the top of the ram's cycle. In case of brake wear, the ram does not stop until it is moved past the top of the stroke and is again moving downwardly toward the work area, thereby presenting a danger to operators having their hands in the work area. In case of brake failure, the ram can cause severe damage to operators having their hands in the work area.

Systems have been heretofore proposed wherein the position of the brake at its stopping position is detected. However, such techniques have not been satisfactory, inasmuch as they merely check brake position and not brake wear. With such prior systems, it is thus possible for an operator to merely adjust the position of the ram instead of checking the brake, thereby ignoring the brake wear until brake failure results. Moreover, previously developed brake wear detecting systems have been subject to failure of their own components, thereby allowing brake wear to go undetected. Prior brake monitoring systems have also been subject to being defeated by an operator by shorting and the like.

SUMMARY OF THE INVENTION

In accordance with the present invention, a brake monitoring method and system is disclosed which does not merely check the position of the brake where it is stopped, but detects the angular distance required for the brake to stop the work producing member during each operating cycle. When the detected distance reaches a predetermined magnitude, excessive brake wear is present. Further, the present system and method checks the various components of the detection system during each operating cycle prior to detecting brake wear. The present system is not subject to being shunted or defeated without terminating operation of the machine.

In accordance with the present invention, a safety system is provided for a machine having a work producing member which is movable from a drive system and which is stopped by a brake. Circuitry is responsive to the drive system for detecting the amount of movement of the drive system between the time of energization of the brake and the time that the work producing member stops. An alarm is operable if the amount of movement exceeds a predetermined magnitude.

In accordance with another aspect of the invention, a safety system is provided for a metal forming machine having a ram operable by a rotative drive system and a brake for stopping the ram. A sensor senses the rotation of the drive system. Circuitry is responsive to the sensor to determine the amount of rotation of the drive system from the time of energization of the brake to the time of stopping of the ram. Circuitry compares the determined amount of rotation of the drive system with a predetermined magnitude. An alarm is operated if the predetermined amount of rotation of the drive system exceeds the predetermined magnitude.

In accordance with a more specific aspect of the invention, a safety system is provided for a press machine having a ram operable by a rotative drive and a brake operable to stop the ram. A sensor generates electrical signals representative of the amount of rotation of the drive. Circuitry is responsive to a first angular position of the drive for directing a first portion of the electrical signals to a counter. Check circuitry prevents further rotation of the drive if a predetermined number of the first portion of electrical signals are not received by the counter. Circuitry is responsive to the application of the brake for directing a second portion of the electrical signals to the counter until the rotation of the drive is stopped. Circuitry prevents further rotation of the drive if the second portion of the electrical signals exceeds a predetermined magnitude.

In accordance with yet another aspect of the invention, a method of detecting brake wear in a metal forming machine having a ram operable by a rotative drive and having a brake for stopping the ram includes sensing the amount of rotation of the drive. The amount of rotation of the drive is then determined from the time of energization of the brake to the time of stopping of the ram by the brake. The determined amount of rotation of the drive is compared with a predetermined magnitude. An alarm is generated if the predetermined amount of rotation exceeds the predetermined magnitude.

DESCRIPTION OF THE DRAWINGS

For a more complete understanding of the present application and for further objects and advantages thereof, reference is now made to the following description taken in conjunction with the accompanying Drawings, in which.

DESCRIPTION OF THE PREFERRED EMBODIMENT

Figure 1:
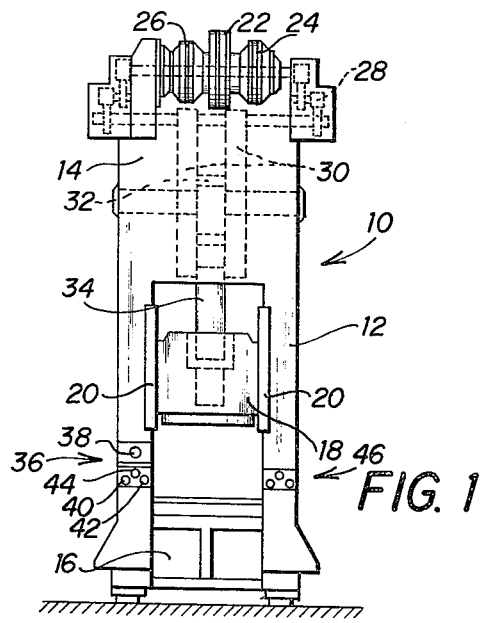
FIG. 1 is a somewhat diagrammatic illustration of a typical metal forming machine utilized in conjunction with the present invention.

Referring to FIG. 1, a typical press is illustrated generally by the numeral 10 and may comprise, for example, a press of the type disclosed in U.S. Pat. No. 2,286,943, issued to David C. Verson et al. It will be understood that press 10 is merely exemplary of any type of machine having a work producing member which is moved by a rotative drive and which is stopped by a brake.

The press 10 includes a main frame 12 having a crown 14 and a bed 16. A reciprocal ram 18 is vertically movable in jibs 20. In the press crown, a motor (not shown) drives a flywheel 22 in the well-knoown manner. The flywheel 22 is connected through a clutch 24, a clutch and brake assembly 26 and suitable gearing 28 to a pair of large gears 30. Gears 30 drive an eccentric 32 to operate a pitman 34 which is connected to the ram 18.

The clutch 24 and clutch brake assembly 26 may be of either hydraulic or pneumatic type, and the supply of fluid applied thereto is under the control of one or more solenoid valves which will be subsequently described. On the frame 12 is a master control station 36 which includes a manually operable function control switch which is movable to a number of different active stable positions such as "off", "single cycle", "inch" and "continuous" positions. Run buttons 40 and 42 are provided which must be simultaneously depressed by the operator to cause operation of the ram 18. A stop button 44 may be depressed by the operator in order to generate an electrical signal to energize the brake by operating a valve, thereby allowing springs to engage the brake of the system in order to stop the movement of the ram 18, although normally limit switches (not shown) cause the ram 18 to be automatically stopped at the top of each stroke. Due to the requirement of valve operation and due to the speed of the ram 18, a time interval occurs between the energization of the brake by button 44 or limit switches and the final engagement of the brake and then the final stopping of the ram. A similar operator control station 46 is provided to enable operation of the device by two operators. For a more detailed description of the construction and operation of the control system for the press shown in FIG. 1, reference is made to U.S. Pat. No. 3,666,965, issued May 30, 1972 and entitled "Press Control Apparatus" to the present Applicant and assigned to the present Assignee, along with U.S. Pat. No. 3,628,357, issued Dec. 21, 1971, and entitled "Safety Control Circuit for Presses and the Like" to Applicaant and assigned to the present Assignee.

Figure 2:
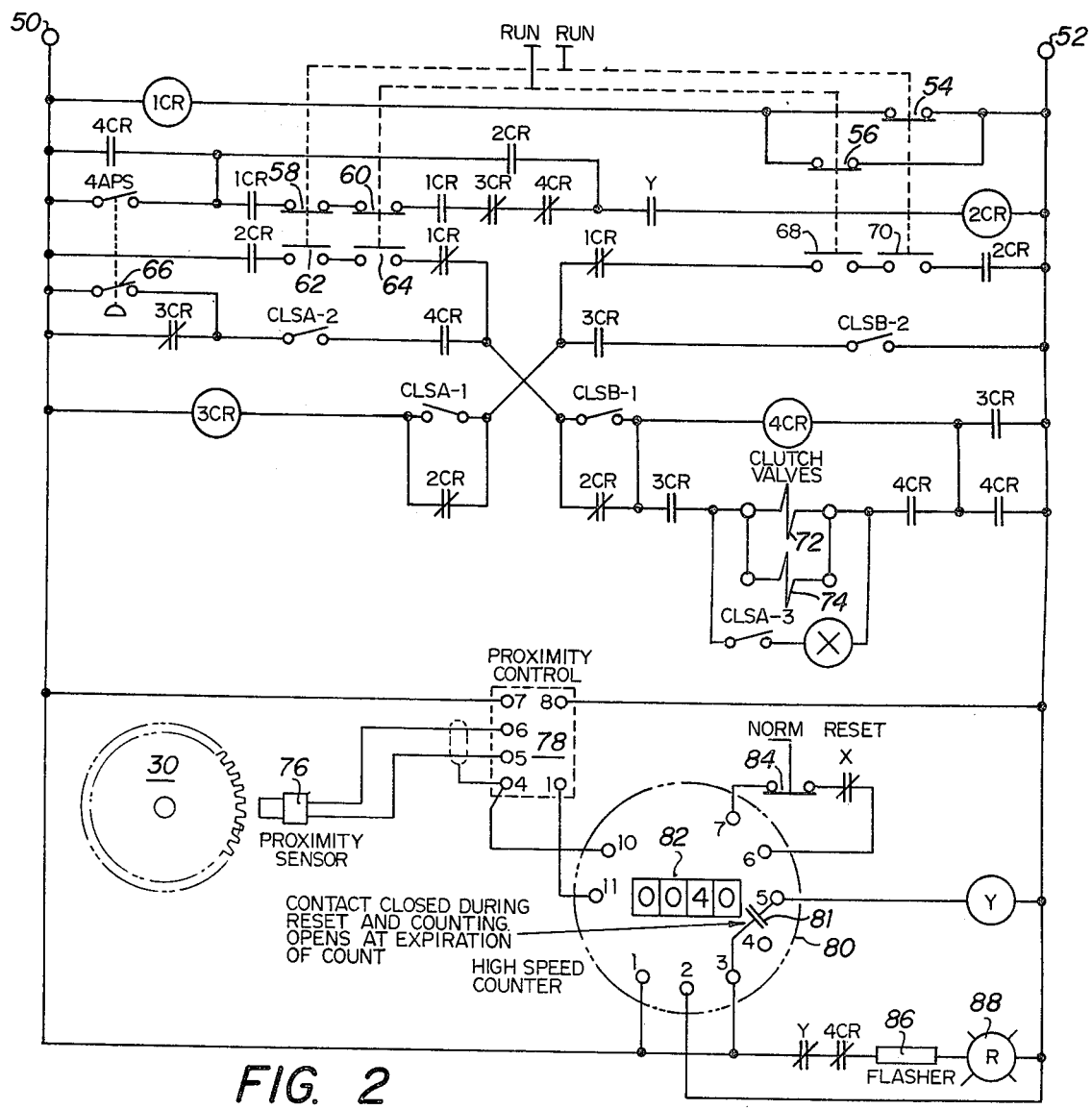
FIG. 2 is an electrical schematic of the present safety device.

FIG. 2 illustrates the brake wear detection circuitry of the present invention. As noted, when a metal forming machine such as a press brake or the like is utilized over a period of time, the system brake sometimes becomes worn or in need of adjustment. When this occurs, the distance or angle required for the brake to stop the movement of the ram becomes lengthened, thereby presenting a safety hazard to the operator. In previously developed safety systems, the position of the ram when it is stopped by application of the brake has been detected. Such systems provide an alarm when the ram does not stop at the top of its stroke. However, such systems do not thus directly check the operation of the brake, but check only the position of the ram when stopped by the brake. Thus, an operator could merely adjust the position of the ram instead of actually checking the brake, and thus would not detect the fact that the brake was becoming worn and indeed might be subject to failure. The present system overcomes this disadvantage by directly detecting the distance or angle required for the brake to stop the ram after each cycle of operation.

Referring to FIG. 2, a source of power is connected across terminals 50 and 52. A relay 1CR is connected across terminals 50 and 52 in series with normally closed Run switches 54 and 56. Normally open relay contacts 4CR are connected in series with normally open relay contacts 2CR. Normally closed switch 4APS is connected across relay contacts 4CR. Normally open relay contacts 1CR and 1CR and normally closed relay contacts 3CR and 4CR are connected in series with normally closed Run switches 58 and 60 and are tied across relay contacts 2CR. Normally open relay contacts Y are connected in series with relay 2CR.

Normally open relay contact 2CR is connected in series with normally open Run switches 62 and 64 and with a normally closed relay contact 1CR. A normally open switch 66 is connected in parallel with normally closed relay contacts 3CR and is tied to rotary cam switch CLSA-2 and normally open relay contacts 4CR.

Normally closed relay contacts 1CR and normally open relay contacts 2CR are connected in series with normally open Run switches 68 and 70. Normally open relay contacts 3CR are tied in series with normally open rotary cam switch CLSB-2.

Relay 3CR is connected in series with a normally closed rotary cam switch CLSA-1 which is connected in parallel with normally closed relay contacts 2CR, and which are tied to one terminal of relay contacts 3CR.

Normally closed rotary cam switch CLSB-1 is connected in parallel with normally closed relay contacts 2CR. A relay 4CR is connected in parallel with normally open relay contacts 3CR, clutch valve solenoids 72 and 74, normally open relay contacts 4CR and rotary cam switch CLSA-3 and relay X. Normally open relay contacts 3CR are connected in parallel with normally open relay contacts 4CR.

An important aspect of the present invention is a proximity sensor 76 which is disposed adjacent a portion of the rotative drive system which operates the work producing member of the machine. Sensor 76 may comprise any type system for sensing the rotation of the drive system. For example, the proximity sensor 76 may be disposed to detect the rotation of one of the gears of the drive system for the ram 18 shown in FIG. 1. Specifically, one of the gears 30 shown in FIG. 1 which drives the eccentric 32 may be sensed by the proximity sensor 76 in order to monitor the movement of the ram. Sensor 76 thus generates electrical pulses which represent the passage of gear teeth on gear 30 past the sensor.

The output of the proximity sensor 76 is applied to a proximity control circuit 78 which operates to apply power to the proximity sensor 76 and to apply the output of the sensor 76 to a high speed counter 80. The high speed counter includes a thumbwheel counter setting device 82 into which a desired magnitude may be manually set. The counter 80 also includes a relay 81 which is closed during reset and counting and which opens when the counter 80 has registered the number of pulses set into the thumbwheel counter setting device 82. The switch 81 is connected in series with a Y relay. A normally closed relay contact X is connected in series with a normally closed switch 84 which is tied across the terminals of the high speed counter 80. The terminals of the counter 80 are also connected through normally closed relay contacts Y and 4CR to a flasher 86 and an alarm light 88. If desired, a numeric readout may be provided with the counter 80 to display the count generated by the sensor 76 during detection of the brake operation.

Figure 3:
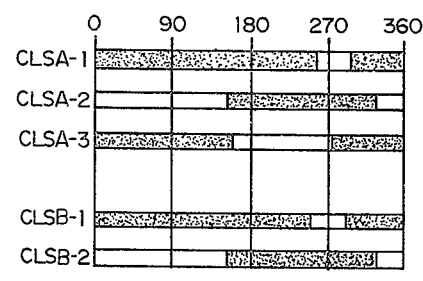
FIG. 3 is a graphical illustration of the energization of the limit switches of the invention.

FIG. 2 illustrates the opening and closing of the rotary cam limit switches of the present circuit. As shown in FIG. 3, the rotary cam switch CLSA-1 is closed during 0°–250° and from 300°–360° of the rotation of the drive system for the ram 18. Rotary cam limit switch CLSA-2 is closed during 160°–330° of rotation of the drive system, while limit switch CLSA-3 is closed from 0°–170° and from 280°–360° of rotation. Switch CLSB-1 is closed from 0°–250° and from 300°–360° of revolution, while switch CLSB-2 is closed from 160°–300° during the rotation of the rotary drive system for the ram 18. As is well-known in the art, such rotary limit switches will generally be positioned about a rotating member of the rotary drive system of the press and are sequentially energized and de-energized by cams attached to the rotating member.

In operation of the system shown in FIG. 2, when the press Run buttons are depressed, switches 54, 56, 58 and 60 are opened, while switches 62, 64, 68 and 70 are closed. Consequently, relay 1CR is de-energized, causing corresponding operation of the various 1CR relay contacts. Power is applied to the relay Y, thereby causing closing of the Y relay contact connected in series with relay 2CR and therefore antirepeat relay 2CR is energized. This causes closing of normally open relay contacts 2CR and therefore power is applied to energize relay 3CR. This causes power to be applied to energize relay 4CR, thereby energizing the clutch valve solenoids 72 and 74 in order to energize the jibs 20 and gears 30 in order to begin movement of the ram 18.

In addition, energization of relay 4CR causes energization of relay X. This causes opening of the relay contact X connected across the high speed counter 80 to cause resetting of the counter and prevents the counter from responding to incoming pulses.

Rotation of the gear 30 is sensed by the proximity sensor 76 which generates pulses representative of the rotation of the gear 30 to the proximity control 78 and to the high speed counter 80 which is at the present inhibited. After 160° of rotation of the gear 30, the limit switches CLSA-2 and CLSB-2 are closed, as shown in FIG. 3, thereby bypassing the Run button circuit such that the Run buttons may be released.

At 170° of rotation of the gear 30, switch CLSA-3 is opened, as shown in FIG. 3, thereby de-energizing relay X. The X relay contact across the high speed counter 80 closes, thereby causing the counter 80 to respond to incoming pulses from the proximity control 78. This initiates a check operation of the system to determine that the proximity sensor 76, the counter 80 and the associated relay circuitry are correctly working. Assuming that the circuitry is working properly, the counter 80 counts to a predetermined magnitude and trips out. This predetermined magnitude will be varied depending upon press characteristics, but in the system illustrated it will be assumed that the counter trips out when the gear 30 is rotated to 198°. When the counter 80 trips out, the Y relay is de-energized, thereby opening the Y relay contacts and de-energizing the antirepeat relay 2CR.

Limit switches CLSA-1 and CLSB-1 are opened at 250° of rotation of the gears 30 in order to insure that the anti-repeat relay 2CR has been dropped out. If the relay 2CR has been properly dropped out, the normally closed relay switch contacts 2CR to bypass the opened limit switches and the circuit continues operation. Thus, the present circuit provides fail-safe check on operation of the system, for if the system has not operated properly at this point, the press would be stopped when the limit switches CLSA-1 and CLSB-1 are opened at 250° of rotation.

At 280° of rotation of the press, limit switch CLSA-3 recloses, thereby energizing the relay X. The counter 80 is then reset, thereby re-energizing the relay Y. The relay 2CR is prevented from being re-energized at this point by normally closed relay contacts 3CR and 4CR which are opened due to the energization of relays 3CR and 4CR. At 300° of rotation of the press, limit switches CLSA-1 and CLSB-1 are closed to conclude the check of the antirepeat relay.

At 330° of rotation of the press, the rotary cam switches CLSA-2 and CLSB-2 are opened to de-energize the clutch valve solenoids 72 and 74 and the relay X. Relay contact X thus closes across the high speed counter 80 to permit the counter to respond to incoming pulses from the proximity sensor 76. Due to the de-energization of the clutch valve solenoids 72 and 74, the brake is set, thereby causing the ram 18 to be decelerated.

As previously noted, a predetermined magnitude is set into the thumbwheel switch 82 which determines the maximum amount of rotation to be allowed gear 30 before the ram 18 is stopped to thereby provide a check on the quality of the braking action. If the count received by the counter 80 at this point from the proximity sensor 76 is less than the count set in the thumbwheel switch 82, the brake is assumed to be satisfactory and the relay Y will be energized, thereby maintaining the relay 2CR to be energized, as relays 3CR and 4CR have been dropped out. Thus, another run cycle may be initiated by the operator in the same manner.

If, however, the number of gear teeth detected by the proximity sensor 76 and applied to the counter 80 are greater than the count set in the thumbwheel switch 82, the brake operation is not satisfactory. Thus, the counter switch 81 opens, de-energizing the relay Y which de-energizes the antirepeat relay 2CR, thereby preventing a subsequent run cycle. Also upon de-energization of the Y relay, the flasher 86 is energized, thereby causing a flashing indication by the light 88 to indicate a brake problem.

It will be understood that the various angles of operation of the various limit switches of the system may be varied according to press characteristics and brake types. Moreover, the magnitude set in the thumbwheel counter setting 82 may be varied according to desired operating characteristics. A limit to which the thumbwheel switches may be set is provided in the system. If an excessive count is set in the thumbwheel switch 82, the Y relay is not dropped out and the antirepeat relay 2CR would be energized thereby causing the press to stop on the up stroke.

An important aspect of the present invention is that the present system is extremely hard to bypass by shorting around thereof. The present system is not merely a "black box" attached next to the press gears, but is an intimate part of the control circuitry and any attempt to short around the present system would result in malfunction of the press. The present system is extremely valuable in that it does not make a positional check of the ending position of the brake, as such systems may be overcome by the operator merely putting the brake on sooner. Such attempts by the operator to overcome the present invention will not prevent the present system from detecting brake wear.

An important aspect of the present invention is the check function provided by the system in the beginning portion of each rotation of the drive gear of the press which provides a check for the limit switches, the counter, the various relays and valves of the system. If the system detects a malfunction of any of these components, the press is promptly shut down. Once the present system detects brake wear and the alarm light 88 is energized, the system must be reset by proper operation of the reset switch 84. Normally, this resetting switch will require operation by a key to enable resetting only by supervisory and maintenance personnel.

It will be understood that a variety of various components may be utilized for the system shown in FIG. 2. However, in one embodiment, a proximity sensor EE-971-56102 manufactured and sold by Namco Control was utilized. Similarly, a connector assembly EA-972-80023 and a proximity control EE-971-02303 by Namco may be utilized along with the proximity sensor. The counter 80 may comprise, for example, the Eagle signal counter described in Bulletin 129 or any other suitable high speed counter.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A safety system for a machine having a work producing member which is movable by a drive system and which is stopped by a brake comprising:
    means responsive to the drive system for detecting the time interval between the time of energization of the brake and the time that the work producing member stops,
    means for comparing said time interval with a predetermined magnitude, and
    alarm means operable if said time interval exceeds the predetermined magnitude.

2. The safety system of claim 1 and further comprising:
    means for automatically preventing further operation of the work producing member if the amount of movement exceeds said predetermined magnitude.

3. The safety system of claim 1 and further comprising:
    means for automatically self-checking the correct operation of said means for detecting prior to energization of the brake, and
    means responsive to said means for self-checking for preventing further rotation of said drive system upon detection of malfunction of said means for detecting.

4. A safety system for a machine having a work producing member which is movable by a drive system and which is stopped by a brake comprising:
    a proximity sensor for detecting movement of gear teeth in the drive system between the time of energization of the brake and the time that the work producing member stops, and
    alarm means operable if the amount of movement exceeds a predetermined magnitude.

5. The safety system of claim 4 wherein said proximity sensor generates electrical signals representative of the rotation of the gear teeth, and further includes:
    means for counting said electrical signals to derive information on the amount of movement of the drive system.

6. In a metal forming machine having a ram operable by a rotative drive system and a brake for stopping the ram, the combination comprising:
    means for sensing the rotation of the drive system,
    means responsive to said sensing means for determining the amount of rotation of the drive system from the time of energization of the brake and the time of stopping of the ram,
    means for comparing the determined amount of rotation of the drive system with a predetermined magnitude,
    alarm means for being operated if the determined amount of rotation of the drive system exceeds the predetermined magnitude, and
    means for automatically preventing further operation of the work producing member if the determined amount of rotation of the drive system exceeds the predetermined magnitude.

7. The combination of claim 6 and further comprising:
    means for automatically self-checking the correct operation of both said means for sensing and said means for determining the rotation of the drive system prior to energization of the brake.

8. The combination of claim 6 and further comprising:
    means for enabling selective change of said predetermined magnitude.

9. The combination of claim 8 wherein said enabling means comprises a thumbwheel numeric input switch.

10. In a metal forming machine having a ram operable by a rotative drive system and a brake for stopping the ram, the combination comprising:
    a sensor for sensing rotative movement of structure associated with a gear in the drive system and for generating electrical signals in response thereto,
    means responsive to said electrical signals for determining the amount of rotation of the drive system from the time of energization of the brake and the time of stopping of the ram,
    means for comparing the determined amount of rotation of the drive system with a predetermined magnitude, and
    alarm means for being operated if the determined amount of rotation of the drive system exceeds the predetermined magnitude.

11. The combination of claim 5 and further comprising a thumbwheel numeric input switch for enabling selective change of said predetermined magnitude.

12. In a press machine having a ram operable by a rotative drive and a brake operable to stop the ram, the combination comprising:
    timing means responsive to electrical signals representative of the amount of rotation of the drive,
    means responsive to a first angular position of the drive for directing a first portion of said electrical signals to said timing means,
    self-check circuitry for preventing further rotation of the drive if a predetermined number of the first portion of said electrical signals are not received by said timing means,
    means responsive to the energization of the brake for directing a second portion of said electrical signals to said timing means until the rotation of the drive is stopped; and
    means for preventing further rotation of the drive if the second portion of said electrical signal exceeds a predetermined magnitude.

13. The combination of claim 12 wherein said electrical signals are generated by a proximity sensor for generating electrical pulses in response to movement of gear teeth in the drive.

14. The combination of claim 12 wherein said means responsive to a first angular position of the drive comprises a switch operable to cause said timing means to count said first portion of said electrical signals.

15. The combination of claim 12 wherein said self-check circuitry comprises a relay operable to prevent the application of power to the machine drive.

16. The combination of claim 12 wherein said means for directing a second portion of said electrical signals comprises a relay responsive to the energization of the brake.

17. A method of detecting brake wear in a metal forming machine having a ram operable by a rotative drive and having a brake for stopping the ram comprising:
sensing the amount of rotation of the drive,
determining the amount of rotation of the drive from the time of energization of the brake and the time of stopping of the ram by the brake,
comparing the determined amount of rotation of the drive with a predetermined magnitude, and
generating an alarm if the determined amount of rotation exceeds the predetermined magnitude.

18. The method of claim 17 and further comprising:
preventing further operation of the ram if the determined amount of rotation exceeds the predetermined magnitude.

19. The method of claim 17 wherein the amount of rotation of the drive is determined by generating electrical signals representative of the number of gear teeth passing a fixed point.

20. The method of claim 17 and further comprising:
checking the operation of components of the detection system prior to detecting brake wear.

* * * * *